June 15, 1926.

A. R. MITCHELL

UTENSIL GUARD

Filed Dec. 14, 1925

1,588,980

Arthur R. Mitchell

Patented June 15, 1926.

1,588,980

UNITED STATES PATENT OFFICE.

ARTHUR R. MITCHELL, OF CHICAGO, ILLINOIS.

UTENSIL GUARD.

Application filed December 14, 1925. Serial No. 75,407.

This invention relates to certain new and useful improvements in utensil guards and refers more particularly to a guard for protecting the handles of coffee pots, tea pots, percolators and the like.

Utensils of the character described are usually provided with wooden handles secured in place by removable screws and when used on open top gas ranges the lower portion of the handle becomes burnt and, after a comparative short period of use, must be renewed. This is avoided by the invention forming the subject matter of this application which has for one of its objects the provision of a heat deflector or guard of simple design and construction which may be readily secured under the utensil handle to thus protect the same from the destruction by heat.

Another object of this invention resides in the provision of a guard of the character described which is capable of being readily secured in position beneath the utensil handle by loosening of the securing screw for the lower portion of the handle and inserting the attaching flange portion of the guard therebetween and tightening the screw again.

And a still further object of this invention resides in the provision of an improved utensil guard of the character described which is readily detachably secured in position and which will not become detached upon the loosening of the handle.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated several complete examples of the physical embodiment of my invention constructed according to the best modes I have so far devised for the practical application of the principles thereof, and in which.

Referring now more particularly to the accompanying drawing, in which like numerals designate like parts throughout the several views, the numeral 5 designates a suitable utensil which, in the present illustration, is the conventional coffee percolator provided with a handle 6, the upper and lower horizontal attaching portions 7 and 8 of which have their inner ends suitably attached or secured to the percolator by detachable bolts or screws 9 and 10, respectively.

Figure 1:
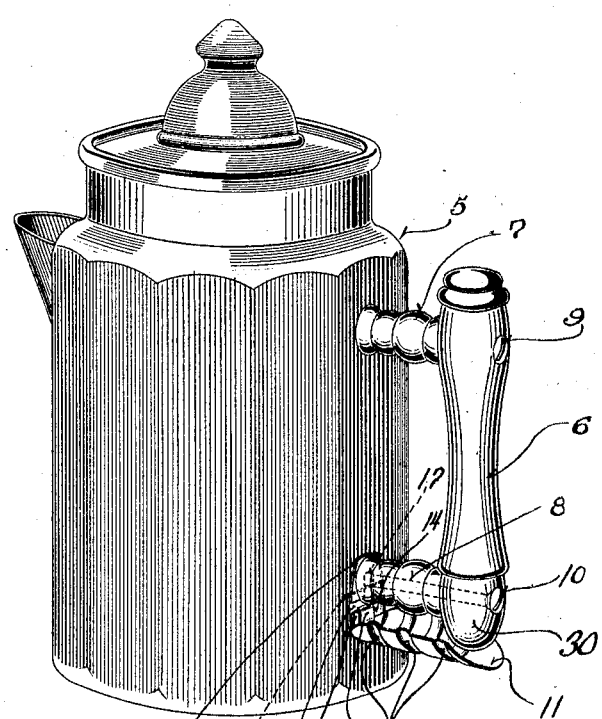
Figure 1 is a perspective view of a percolator illustrating a guard embodying this invention applied thereto.
Figure 2:
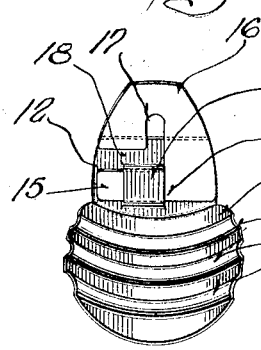
Figure 2 is a perspective view of one embodiment of my improved guard detached from the utensil.

As illustrated by dotted lines in Figure 1, the handle attaching bolts or screws pass through the handle 6 and the horizontal attaching portions and have their inner ends threaded into the body of the percolator.

The heat from the flames of the burner of an open top gas range often extends over the sides of the utensil burning off the lower portion of the handle in a short time or so badly damaging the handle that the same must be renewed. This is also true when the flames of the burner are turned sufficiently low as to play only on the bottom of the percolator, as the heat therefrom is generally sufficient to, in time, destroy the handle.

By the device illustrated in the drawing, destruction of the handle by the heat of the burner flame is prevented. The guard or protector which I provide is preferably struck or stamped from sheet metal such as aluminum, tin or the like and has a substantially horizontal body part 11 of a length equal to, if not slightly greater than, the distance from the body of the percolator to the outer face of the handle and of a width greater than that of the handle.

A vertical attaching end or portion 12 extends upwardly from the inner end of the guard and has a medial portion thereof struck inwardly, as at 13, to provide a transverse slot 14 in which the locking tongue 15 of an attaching member 16 is frictionally secured. The member 16 is adapted to form a continuation of the guard vertical portion and has a central vertical slot 17 therein from which a transverse slot 18 leads to one edge of the member, the slot 18 defining the tongue 15. The slot 18 is closed by the guard vertical portion when the member 16 is secured thereto to thus close the slot 17 except for its upper end which is approximately a size to receive the handle bolt 10.

The guard is secured in position by loosening the bolt 10 and inserting the attaching member 16 between the inner end of the horizontal handle portion 8 and the body of the percolator, passing the slot 18 over the bolt 10 until it engages in slot 17 when the attaching member is dropped down to dispose the bolt in the upper portion of the slot 17. The guard proper is then connected with the member 16 by engaging the tongue 15 on the slot 14, when the bolt 10 is tightened. With the construtcion illustrated, the loosening of the handle by the accidental unscrewing of the bolt 10 a short distance will not permit the guard to become detached, as will be readily apparent.

As illustrated, the guard portion proper is arcuate in transverse section and is provided with transverse ribs or beads 19 formed therein and extending from side to side to provide an increased radiating surface to insure greater protection to the handle against heat and to reinforce the guard.

Figure 3:
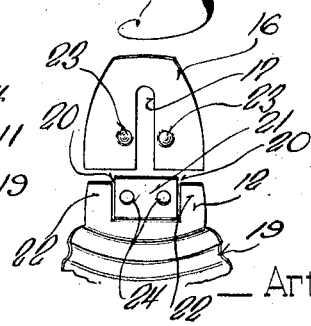
Figure 3 is a fragmentary perspective view of a slightly modified form of guard.

In Figure 3, a slightly modified form of my invention is illustrated in which the end portion 12 is slotted, as at 20, to provide a medial offset part 21 between which and the side tongues 22 formed by the slots 20 the lower end of the attaching member 16 is engageable, the attaching member having its slot 17 extended to its lower edge and being closed by the offset portion 21 when secured thereto. The attaching member has a plurality of projections or teats 23 which engage in apertures 24 in the offset portion 21 to provide means for firmly but removably securing the guard proper to the attaching member. In this form of my invention the attaching member 16 is inserted over the screw 10 between the horizontal handle portion 8 and the percolator proper and the guard is then snapped in place.

Figure 4:
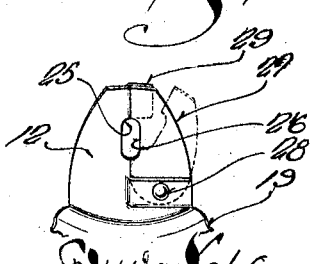
Figure 4 is a view similar to Figure 3 of a further modification.

In Figure 4. a still further modification of my invention is illustrated in which the end member 12 is cut away along one side and has a slot 25 formed medially in its inner edge which conforms with a slot 26 in a movable latch portion 27 pivoted, as at 28, to the end portion 12 and adapted to be frictionally held in its full line position illustrated in Figure 4 by a tongue part 29 on the upper end of the portion 12. In this form of my invention, the guard is secured in place by swinging the latch to its dotted line position and engaging the end porton 12 between the handle portion 8 and the percolator with the bolt 10 engaged in the notch 25, when member 27 is swung to its full line position and the bolt 10 tightened.

The slot 17 being elongated permits the adjustment of the guard to accommodate handles having bottom extensions 30 of various lengths.

From the foregoing description taken in connection with the accompanying drawing it will be readily obvious to those skilled in the art to which an invention of this character appertains that I have provided an improved utensil handle guard which is of simple construction and capable of being produced in quantities at a very low cost.

What I claim as my invention is:

1. A handle protector of the character described having a portion adapted to be detachably connected to a handle and another portion arranged at an angle thereto to serve as a heat deflector, the first mentioned portion having a vertical slot therein and a transverse slot leading therefrom to the edge of said portion to afford means for the ready attachment of the protector to the handle, and means closing the transverse slot.

2. A handle protector of the character described having a portion adapted to be detachably connected to a handle and another portion arranged at an angle thereto to serve as a heat deflector, the first mentioned portion having a slot therein to afford means for readily attachment of the protector to the handle, and said last mentioned portion being arcuate in transverse section and provided with a plurality of transverse corrugations extending from edge to edge.

3. A handle protector of the character described, comprising a plate having a right angular extension at one end, and a separate, movable member co-acting with the extension of said plate to secure the same about the attaching bolt of a handle.

4. A handle protector of the character described having a portion adapted to cover the lower part of a handle to serve as a heat deflector, an attaching member having a slot adapted to receive the attaching bolt of the handle with which the guard is used, and means detachably connecting said attaching member with the guard.

5. A handle protector of the character described having a portion adapted to cover the lower part of a handle to serve as a heat deflector, a separate attaching member having an approximately right-angular slot adapted to receive the attaching bolt for the handle in its vertical portion, and means connecting said attaching portion with the guard after the attaching portion has been connected with the handle bolt.

6. A handle protector of the character described having a portion adapted to cover the lower part of a handle to serve as a heat deflector, an attaching member having an approximately right-angular slot adapted to receive the attaching bolt for the handle in its vertical portion, and means connecting said attaching portion with the guard after the attaching portion has been connected with the handle bolt, and means closing the transverse portion of said slot when the attaching member is connected with the guard.

In testimony whereof I affix my signature.

ARTHUR R. MITCHELL.